United States Patent [19]

Granda et al.

[11] 4,013,597

[45] Mar. 22, 1977

[54] FAST COOLING STYRENE POLYMER FOAMS

[75] Inventors: Jose E. Granda, Aliquippa, Pa.; John J. Quinlan, Atco, N.J.; James J. Garland, Aliquippa, Pa.

[73] Assignee: ARCO Polymers, Inc., Philadelphia, Pa.

[22] Filed: June 17, 1975

[21] Appl. No.: 587,582

[52] U.S. Cl. .................. 260/2.5 B; 260/2.5 S; 260/827; 264/53; 264/237
[51] Int. Cl.² .......................................... C08J 9/22
[58] Field of Search ......... 260/2.5 B, 2.5 F, 2.5 N, 260/827, 2.5 S

[56] References Cited

UNITED STATES PATENTS

| | | | |
|---|---|---|---|
| 3,061,558 | 10/1962 | Alter | 260/2.5 P |
| 3,271,331 | 9/1966 | Ender | 260/2.5 F |
| 3,367,890 | 2/1968 | McManimie | 260/2.5 N |
| 3,505,253 | 4/1970 | Finestone et al. | 260/2.5 B |
| 3,634,344 | 1/1972 | Koerner et al. | 260/2.5 N |
| 3,635,852 | 1/1972 | Finestone et al. | 260/2.5 B |
| 3,663,489 | 5/1972 | Byerley et al. | 260/2.5 F |
| 3,740,358 | 6/1973 | Christie et al. | 260/2.5 F |

*Primary Examiner*—Morton Foelak
*Attorney, Agent, or Firm*—Lewis J. Young

[57] ABSTRACT

Expandable styrene polymer particles which have fast cooling rates during molding are produced by dry blending styrene polymer particles in the presence of 0.05 to 0.4 parts of silicone surfactant per 100 parts of polymer particles. The silicone surfactant is selected from the siloxane-oxyalkylene copolymers having at least one polysiloxane block which contains mers of the general formula $R_2SiO$, where R is selected from the group consisting of alkyl having 1 to 4 carbon atoms and halogenated alkyl having 1 to 4 carbon atoms, and at least one polyoxyalkylene block containing mers of general formula $C_nH_{2n}O$, where $n$ is 2, 3 or 4, attached to said polysiloxane block and terminated by acetoxy or alkyl ether groups.

12 Claims, No Drawings

4,013,597

FAST COOLING STYRENE POLYMER FOAMS

BACKGROUND OF THE INVENTION

This invention relates to a process for making foamed styrene polymers fast cooling during molding by coating silicone surfactants onto the expandable polymer beads by a dry blending process.

The making of low density, cellular, shaped, plastic articles from expandable particles of styrene polymers is well known. Such particles generally contain a blowing agent which boils below the softening point of the polymer and which will cause the particles to expand when they are heated. When the expanded particles are heated in a mold cavity, the particles expand further to fill the mold and fuse together to form a shaped article.

This invention also relates to a process for producing thick-section moldings of foamed styrene polymers.

The formation of molded articles from expandable styrene polymer particles is effected in two steps: (1) pre-expanding of foamable styrene polymer particles to a density of between 1 to 2 pounds per cubic foot; and (2) further heating the pre-expanded particles in a closed mold to cause further expansion and form a fused, one piece article having the shape of the mold. The second step is what is normally referred to as "molding."

The pre-expansion step may be carried out by heating the expandable polymer pellets by any suitable heating medium such as steam, hot air, hot water, or radiant heat. An excellent method of pre-expansion of the particles is a process such as that disclosed in U.S. Pat. No. 3,023,175 by Rodman. Another excellent method is that disclosed in U.S. Pat. No. 3,577,360 by Immel, which teaches the pre-expansion of polymer beads by heating in a dry atmosphere followed by the application of a vacuum to cause the particles to expand to the desired density.

The molding step normally comprises 4 cycles: (1) the preheating cycle in which the empty mold is preheated with steam; (2) the fill cycle in which the mold is filled with pre-expanded polymer particles; (3) the fusion cycle in which the mold is closed and heated with steam to further expand the particles therein and cause the particles to fuse together; and (4) the cool cycle in which the mold is cooled, usually with recirculating water, or the application of vacuum, to cool the polymer below the softening point of the polymer, the mold is opened and the molded foamed molding is removed from the mold.

The molding of large cross-section (thick section) billets of foamed styrene polymers, that are greater than one foot in the smallest dimension, presents many problems not encountered in the molding of thin section parts.

One of these problems is the fact that as the particles expand in the fusion cycle against the hot mold surfaces, the surface of the billet fuses into a solid surface which insulates the core or center portion of the billet from the heating medium. The resulting molded billet thus has a well-fused surface but has decreasingly good fusion as the core of the billet is approached. This decreased internal fusion of the billet is highly undesirable because the core particles tend to break away from one another or crumble, when the billet is cut up into smaller sizes.

A further problem in the molding of large billets is that during the preheat cycle large amounts of steam are required to heat the massive molds. The preheat cycle is done with the vent drains of the mold open to permit the drainage of condensed water from the mold. The preheat cycle is normally necessary because if the mold is cold when the fusion cycle is begun, the steam used for expanding the particles condenses on the surface of the cold mold causing excess water to be present during the fusion cycle. The water thus formed tends to prevent fusion between the particles and to produce water-wet moldings.

The problems of the fusion and preheat cycles can be eliminated by the process of pre-steaming, as described in U.S. Pat. No. 3,855,377.

After the granules have been heated in the mold to form the desired articles, the article must be cooled for a relatively long period of time, depending upon the thickness of the article, before it can be removed from the mold in a self-supporting state to retain its shape outside the mold. Foamed plastic has good insulation qualities, so the cooling time for the article consumes a large part of the molding cycle and greatly restricts the number of articles that can be produced from a mold in a given period of time.

The cooling time is not appreciably shortened by applying cooling media to the surface of the article or to the mold surface since the heat transfer through the article is extremely slow. This low heat transfer rate is in fact one of the properties which makes these articles useful, for example, for insulation. If the articles are removed from the mold too soon, the combination of the softness of the thermoplastic material and the pressure due to the hot interior of the article will cause the article to bulge and thereafter not have the desired shape.

SUMMARY OF THE INVENTION

In accordance with the present invention, surfactants, selected from the siloxane-oxyalkylene copolymers having at least one polysiloxane block which contains mers of the general formula $R_2SiO$, where R is selected from the group consisting of alkyl having 1 to 4 carbon atoms and halogenated alkyl having 1 to 4 carbon atoms, and at least one polyoxyalkylene block containing mers of general formula $C_nH_{2n}O$, where $n$ is 2, 3 or 4, attached to said polysiloxane block and terminated by acetoxy or alkyl ether groups, are coated onto styrene polymer particles by dry blending the particles with the surfactant. Coating with from 0.05 to 0.4 parts of silicone surfactant per 100 parts of polymer gives a foamable product which, when molded, requires less time to cool than styrene polymers not having the surfactant present.

DETAILED DESCRIPTION OF THE INVENTION

In accordance with this invention, a variety of expandable thermoplastic homopolymers and copolymers can be rendered fast cooling. The polymers may be derived from vinyl aromatic monomers including styrene, vinyltoluene, isopropylstyrene, alpha-methylstyrene, nuclear methylstyrenes, chlorostyrene, tert-butylstyrene, etc., as well as copolymers prepared by the copolymerization of a vinyl aromatic monomer with monomers such as butadiene, alkyl methacrylates, alkyl acrylates, acrylonitrile and maleic anhydride wherein the vinyl aromatic monomer is present in at least 50% by weight of the copolymer. For the purpose of convenience, these polymers and copolymers are referred to herein as styrene polymers.

Especially useful are polystyrene, and copolymers of styrene with 50–30 weight percent of acrylonitrile, maleic anhydride, or methyl acid maleate.

The styrene polymers may be in the form of beads, granules, or other particles convenient for molding operation. Especially useful are the beads formed by the suspension polymerization of the vinyl aryl monomers alone or in combination with the minor amount of copolymerizable monomers.

The styrene polymers, can, of course, be produced by any of the known techniques. The preferred method of preparation is the suspension technique, which gives bead or pellet shaped product.

The silicone surfactant is added to the polymer particles by mixing the two materials and dry blending the mixture, for example in a Henschel mixer, for a time sufficient to insure intimate mixing.

The character and extent of mixing will vary somewhat, usually ranging from about 15 seconds to one hour; typically, 14 seconds to 10 minutes at top speeds from 500 to 2500 inches per second, in order to be of sufficiently high intensity to abrasively mix the surfactant and beads.

Various high intensity mixers may be used. Typically these involve a rotating shaft which carries a transversely extending blade member or members such as an impeller turbine or the like. Preferably the mixing blade or blades are capable of achieving a linear tip velocity as states of at least about 200 inches per second and preferably about 500 to 2500 inches per second. Exemplary of equipment which is satisfactory is the Papenmeier mixer, obtainable from Welding Engineers, Inc., Norristown, Pennsylvania, and the Prodex-Henschel mixer illustrated in U.S. Pat. No. 2,945,634.

Preferably the mixer combines the principle of moving the particles being mixed both locally and in gross. That is to say, it is designed to turn over the material well in order that all the material in the mixer will, in due course, be within the region of high shear supplied by the rapidly moving mixer blades. The mixer of U.S. Pat. No. 2,945,634, provides vortical mixing at high shear rates and, accordingly, accomplishes the objectives of both high shear local mixing and good movement in gross.

The mixer blade or rotor may operate at a variety of angular velocities, but it is important that a substantial peripheral speed be developed. For example, such commercial mixer with a pitched blade and having a radium of about one-third foot, may develop a speed on an order of about 720 inches per second at its blade tips and can accomplish mixing of a batch of beads and surfactant aggregating about 2000 grams in quantity in around 30 seconds. With some surfactants, as little as 15 seconds will suffice, while in other instances a few minutes mixing will be desirable.

The expandable styrene polymer particles may be prepared by impregnating the styrene polymer particles with a suitable blowing agent. The blowing agent may be added to the aqueous suspension in which the polymer particles were prepared and prior to the separation of the particles from the aqueous reaction medium.

Alternatively, particles of styrene polymer may be resuspended in an aqueous medium and impregnated with blowing agent and silicone surfactant. In this case, suspending agents are added to the water to keep the particles from agglomerating at the elevated temperatures used during the impregnation process. Suitable suspending agent systems are, for example, those described in D'Alelio patent, U.S. Pat. No. 2,983,692, such as tricalcium phosphate in combination with an anionic surfactant.

The impregnation is conventionally carried out at temperatures ranging from about 80° to 150° C. Increasing the temperature makes the impregnation proceed at a faster rate.

The blowing agents are compounds which are gases or which will produce gases on heating. Preferred blowing agents include aliphatic hydrocarbons containing from 4–7 carbon atoms in the molecule, such as butane, pentane, hexane, heptane, cyclohexane, and the halogenated hydrocarbons which boil at a temperature below the softening point of the polymer. Mixtures of these agents may also be used, such as a mixture of 40–60% n-pentane and 60–40% trichlorofluoromethane. Usually from 3 to 20% of blowing agent per 100 parts of polymer is incorporated by the impregnation.

The silicone surfacant suitable for the present invention are the siloxane-oxyalkylene copolymers having at least one polysiloxane block which contains mers of the general formula $R_2SiO$, where R is selected from the group consisting of alkyl having 1 to 4 carbon atoms and halogenated alkyl having 1 to 4 carbon atoms, and at least one polyoxyalkylene block containing mers of general formula $C_nH_{2n}O$, where $n$ is 2, 3 or 4, attached to the said polysiloxane block and terminated by acetoxy or alkyl ether groups.

The oxyalkylene mer $C_nH_{2n}O$ may be, for example, oxyethylene, oxy-1,2-propylene, oxy-1,3-propylene, oxy-1, 2-butylene or oxy-1,4-butylene. The block $(C_nH_{2n}O)_m$, when polymeric may be homopolymer or a copolymer containing different oxyalkylene mers.

Preferred siloxane-oxyalkylene copolymers suitable for this invention are the dimethylsiloxaneoxyalkylene copolymers having a number average molecular weight of between 5000 and 10,000 of which the polyoxyalkylene blocks make up between 1500 and 3000, the polyoxyalkylene blocks are terminated on one end by the polysiloxane block and on the opposite end by an acetoxy group or an alkyl ether group where the alkyl group may be for example, methyl, ethyl, propyl, butyl, octyl, octadecyl, cyclohexyl, benzyl, or phenyl and the polyoxyalkylene blocks contain from 40 to 60% by weight of ethylene oxide, the remainder being preferably propylene oxide.

The silicone-oxyalkylene copolymers may be prepared by any of the known processes such as, for example, those described in U.S. Pat. Nos. 2,834,748; 2,917,480; 3,518,288; 3,541,127; 3,560,544; or 3,563,924.

The silicone surfactant is added to the polymer particles by dry blending in a suitable mixer. Best results are obtained when amounts of silicone surfactant between 0.05 and 0.4 parts per 100 parts of polymer are added. Less than 0.05 part of surfactant does not give sufficiently low cooling times, greater than 0.4 parts of surfactant serve no useful purpose and increase the cost of the products.

The invention is further illustrated by the following examples wherein parts are parts by weight unless otherwise indicated.

EXAMPLE I

To a Henschel mixer, there was charged 100 parts of polystyrene beads having a particle size of predominantly through 16 and on 35 mesh, U.S. Standard Sieve, containing 8 parts of n-pentane blowing agent, and 0.25 parts of silicone surfactant [dimethylsiloxane-oxyethylene-oxypropylene copolymer having a number average molecular weight of about 6000 with polyoxyethylene chains having a total number average molecular weight of about 2000, a ratio of ethoxy to propoxy groups of 1 to 1, and capped with acetoxy groups, and the copolymer having a cloud point of 100° F. at 1% concentration in water]. The mixture was blended at 610 rpm. for 25 seconds and the speed of the mixer was then increased to 1220 rpm. for 5 seconds and the mixer allowed to empty while still rotating. The peripheral speeds represented by the rpms. were 544 and 1086 inches per second, respectively. A control experiment was run using the above procedure omitting the siloxane-oxyalkylene copolymer.

The beads from the above blending process were pre-expanded to a density of about 1.00 pounds per cubic foot (p.c.f.). The pre-expanded beads were then molded into 98 × 25 × 18 inches billets by placing the beads in a conventional mold consisting of a porous mold cavity surrounded by a steam chest. Steam at 30 psig was introduced into the steam chest to cause the granules to expand and fuse together. After the steam was shut off, cooling water was circulated through the steam chest. (As used, hereinafter, the term "foam cooling time" is defined at the time it is necessary to circulate the cooling water at 30° C. through the steam chest before the billet is self supporting and will not expand when it is removed from the mold cavity.) Billets molded from these granules were self supporting and could be removed from the mold after 5 minutes foam cooling time. Billets molded from the control granules had a foam cooling time of 35 minutes.

Repeating this procedure using concentrations of 0.15 and 0.35 part of the same dimethylsiloxaneoxyethylene copolymer per 100 parts of beads gave products having foam cooling times of 9 and 25 minutes, respectively. This represented savings in overall molding cycle time of 67 and 26%, respectively.

EXAMPLE II

The expandable polystyrene beads having 8.0% pentane as blowing agent were dry blended in a Henschel mixer for 25 seconds at 610 rpm. and then at 1220 rpm. for 5 seconds to completely coat the polymer beads with 0.25 parts of the following siloxane-oxyalkylene copolymers per 100 parts of beads:

A. a dimethylsiloxane-oxyethylene copolymer having a number average molecular weight of about 2400 with polyoxyethylene chains having a total number average molecular weight of about 900, a hydroxyl number of 70, and a viscosity of about 350 centistokes at 77° F.

B. a dimethylsiloxane-oxyalkylene copolymer having a number average molecular weight of about 1600, a hydroxyl number of 65, and a viscosity of 0.250 centistokes at 77° F., with a polyoxyalkylene chain having 75% oxyethylene mers and 25% oxypropylene mers and a total number average molecular weight of about 500.

The beads coated with the copolymers A and B were pre-expanded and molded in the thick-section mold of Example I.

The beads coated with copolymer A had a foam cooling time of 40 minutes compared to a time of 35 minutes for the uncoated polystyrene beads — an increase of 5 minutes in cool time and, correspondingly, a 5 minute increase in total mold cycle times.

Similarly, the beads coated with copolymer B gave moldings having a foam cooling time of 45 minutes — again an increase in total mold cycle time.

Thus, the lower molecular weight siloxane-oxyalkylene copolymers having hydroxy end groups are not effective when applied by the dry-blend process of the present invention. The copolymers suitable for the present invention are only those having a number average molecular weight greater than 5000, with a polyoxyalkylene portion having a number average molecular weight greater than 1500 and terminated by an acetoxy or alkoxy group.

The production of articles having a foamed polymer structure involves generally a molding cycle that includes preheating the mold, charging the mold with expandable polymeric particles, heating the granules in the mold, and then cooling the resulting foamed structure to a temperature at which the material is self-supporting and will retain its shape. The time consumed in a typical molding process as carried out heretofore breaks down as follows:

mold preheat — about 0.25 minutes;
filling the mold — about 1 to 3 minutes;
heating the mold to fuse — about 0.5 minutes;
cooling the finished article — about 20 to 40 minutes.

From these times, it is obvious that the major portion of the time involves the cooling step.

In the present invention, the foam cooling time is reduced to as little as 5 minutes. Since the other three times remain the same, the overall mold cycle time is reduced by as much as 75%. This means that by using the product of the invention, over twice as many articles can be produced from the same piece of molding equipment in a given period of time as compared with the production of articles by the use of the hertofore known expandable polymers.

We claim:

1. Method of making foamable styrene polymer particles which yield fast cooling foamed moldings of large cross-section consisting of intimately mixing a dry blend of
    a. styrene polymer particles containing 3 to 20 weight per cent of a blowing agent, and
    b. 0.05 to 0.4 weight percent of a silicone surfactant selected from the siloxane-oxyalkylene copolymers having (1) at least one polysiloxane block which contains mers of the general formula $R_2SiO$ where R is selected from the group consisting of alkyl having 1 to 4 carbon atoms and halogenated alkyl having 1 to 4 carbon atoms, and (2) at least one polyoxyalkylene block attached to said polysiloxane block, and terminated by acetoxy or alkyl ether groups, and containing mers of general formula $C_nH_{2n}O$, where $n$ is 2, 3 or 4.

2. The method of claim 1 wherein said styrene polymer particles are polystyrene.

3. The method of claim 1 wherein said styrene polymer particles are a copolymer of styrene with minor amounts of maleic anhydride.

4. The method of claim 1 wherein said styrene polymer particles are a copolymer of styrene with minor amounts of acrylonitrile.

5. The method of claim 1 wherein said styrene polymer particles are a copolymer of styrene with minor amount of methyl acid maleate.

6. The method of claim 1 wherein said silicone surfactant is a dimethylsiloxane-oxyalkylene copolymer having a number average molecular weight of between 5000 and 10,000, of which the polyoxyalkylene blocks make up between 1500 and 3000, and the polyoxyalkylene blocks contain from 40 to 60% by weight of ethylene oxide.

7. A composition consisting essentially of styrene polymer particles containing dispersed throughout 3 to 20 weight per cent of a blowing agent and coated by dry blending on the surface thereof by 0.05 to 0.4 weight per cent of a silicone surfactant, said surfactant being a siloxane-oxyalkylene copolymer having (1) at least one polysiloxane block which contains mers of the general formula $R_2SiO$ where R is selected from the group consisting of alkyl having 1 to 4 carbon atoms and halogenated alkyl having 1 to 4 carbon atoms, and (2) at least one polyoxyalkylene block attached to said polysiloxane block, and terminated by acetoxy or alkyl ether groups and containing mers of general formula $C_nH_{2n}O$, where $n$ is 2, 3 or 4.

8. The composition of claim 7 wherein the silicone surfactant is a dimethylsiloxane-oxyalkylene copolymer having a number average molecular weight between 5000 and 10,000, of which the polyoxyalkylene blocks make up between 1500 and 3000, and the polyoxyalkylene blocks contain between 40 and 60 weight percent of ethylene oxide.

9. The composition of claim 7 wherein the styrene polymer is polystyrene.

10. The composition of claim 7 wherein the styrene polymer is a copolymer of styrene with minor amounts of acrylonitrile.

11. The composition of claim 7 wherein the styrene polymer is a copolymer of styrene with minor amounts of maleic anhydride.

12. The composition of claim 7 wherein the styrene polymer is a copolymer of styrene with minor amounts of methyl acid maleate.

* * * * *